United States Patent [19]

Pagano

[11] 3,872,709

[45] Mar. 25, 1975

[54] FRACTURE RESISTANCE TESTING METHOD

[75] Inventor: Victor H. Pagano, Rochester, Mich.

[73] Assignee: The United States of America as represented by the Secretary of the Army, Washington, D.C.

[22] Filed: Feb. 7, 1974

[21] Appl. No.: 440,405

[52] U.S. Cl. .................................................. 73/12
[51] Int. Cl. ........................................... G01n 3/30
[58] Field of Search ................ 73/101, 167, 12, 102

[56] References Cited
UNITED STATES PATENTS

| | | | |
|---|---|---|---|
| 3,249,046 | 5/1966 | Balchan et al. | 73/12 X |
| 3,793,874 | 2/1974 | Shockey et al. | 73/12 |

*Primary Examiner*—Jerry W. Myracle
*Attorney, Agent, or Firm*—John E. McRae; Robert P. Gibson; Nathan Edelberg

[57] ABSTRACT

There is disclosed a method for testing a specimen plate, such as armor plate, for measuring resistance to fracture in the thickness direction. The test involves machining annular grooves to create graduated size buttons in one face of a test plate, and thereafter applying a uniform shock force to the other face of the plate. The shock energy created is more heavily concentrated in the smaller dimensioned buttons and less heavily concentrated in the larger dimensioned buttons. Therefore, the size of button can be related to the plate's resistance to fracture or toughness under shock loading.

12 Claims, 3 Drawing Figures

FRACTURE RESISTANCE TESTING METHOD

The invention described herein may be manufactured, used, and licensed by or for the Government for governmental purposes without payment to me of any royalty thereon.

BACKGROUND OF THE INVENTION

At present, there is no standard method by which to measure toughness in the thickness direction. This shortcoming largely exists because of lack of need. Most engineering applications do not place much design importance on this direction. As a consequence, little work has been done to evaluate this diretion with suitable test methods. What little has been done has been accomplished using scaled down conventional mechanical property test specimens. The reduced test areas and gage lengths have often produced test results which were not considered adequate for valid property representation. In the specific case of impact toughness for which this invention is directed, tests are limited to plate thickness of two inches or greater to accommodate the primary length or size of charpy V-notch impact specimen. In addition to the size problem, location of the central V-notch becomes fixed with relation to material thickness. Unless thicknesses are quite large, the notch position or impact area cannot be adjusted to evaluate a specific depth within the thickness of the material.

It is believed that the partial value of scale application or part time limited application of conventional test methods will not serve to properly assess material properties in the thickness direction. There are applications where reliable measurement of thickness direction properties can serve a useful purpose in predicting material performance or indicating acceptable material quality. One of these is the application of armor metals in vehicle ballistic design. Material performance is very dependent upon mechanical properties that exist along the thickness direction. More specifically, the impact and penetration resistance of an armor to projectile attack is controlled by the material's ductility or toughness in the short transverse or thickness direction.

It is believed that with a standard tool for making thickness direction toughness measurements, ballistic performance can be better correlated with material properties. It would eliminate the anomalies in material behavior currently encountered from predictions made or generalized correlations drawn by property tests conducted in the primary material direction.

THE PRESENT INVENTION

The present invention is directed to a method for testing a plate for resistance to fracture in the thickness direction, wherein one face of the plate is machined to form a series of islands or buttons. The plate is mounted in a test fixture so that the islands are out of contact with the mounting structure. An elastic shock load of known intensity is applied on the other face of the plate through a kinetic energy device or contact explosive to create a critical feature stress along one or more of the interfaces connecting the plate to the metal islands or buttons. Visual observation of the smallest size button displaced provides an indication of the fracture resistance of the plate.

THE DRAWINGS

FIGS. 1 and 2 illustrate a rectangular specimen test plate clamped at its peripheral edge to a mounting fixture 12.

Face 14 of the test plate in the as-received condition is flat and uninterrupted. Prior to insertion of plate 10 in the mounting fixture, the plate is machined to form a number of annular grooves, 16, 18, 20 and 22, in its surface 14. The grooves are of the same depth but of differing diameter, whereby the defined islands, 24, 26, 28 and 30 have different sized connecting areas. The islands are hereinafter referred to as buttons or protuberances.

The present invention, as applied to the illustrated structure, involves subjecting each island or area to essentially the same quantity of shock energy. The smaller area islands will have a greater concentration of stress than the larger islands; hence, smaller islands will present the more severe test condition regarding material fracture strength. This presumes that the energy input applied is within material property elastic limits. Visual observation of the smallest island experiencing fracture displacement serves as an indication of the relative fracture resistance of the material.

The shock energy may be imparted to the test plate by impacting a thin disc element against the non-machined face 31 of the plate. Alternately, the shock energy may be applied to the specimen by detonating a thin sheet element of explosive on the non-machined face 31. Numeral 32 is intended to indicate the impact disc element.

Figure 1:
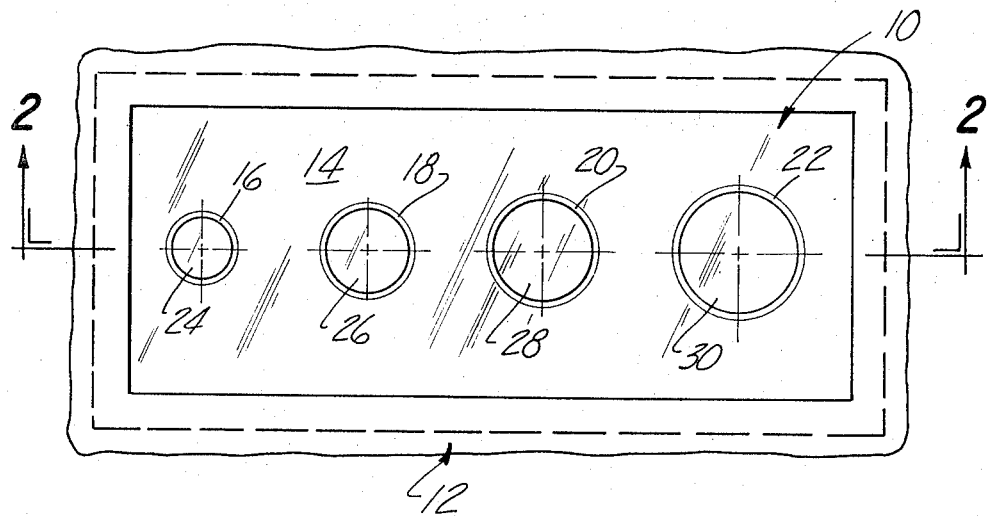
FIG. 1 shows in plan a test plate machined with various diameter annular grooves to provide a range in area or button size in order to scale material response under any applied load.
Figure 2:
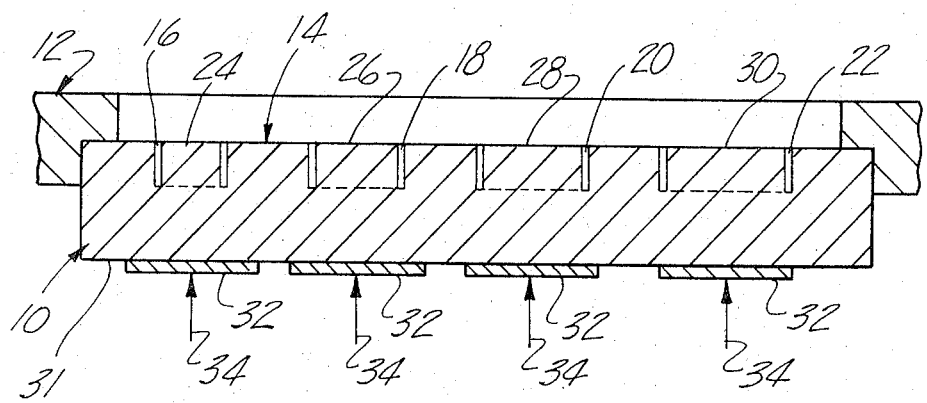
FIG. 2 is a transverse sectional view taken on line 2—2 in FIG. 1.

As shown in FIG. 2, each island, 24, 26, 28 or 30 is subjected to a shock force from a separate disc element. Each disc element is flat to generate shock force normal to specimen face 31. Also, the disc elements would have the same dimension and mass so that the generated force on each button would be the same. In the case of the impact disc elements, each element would be propelled from a gas gun at a selected velocity in the arrow 34 direction. In the case of the explosive sheet, it would be detonated by a fuse originating from one of the edges of the test plate. This would produce a continuous uniform force across the test plate and in direct alignment with the respective islands, 24, 26, 28 or 30.

Figure 3:
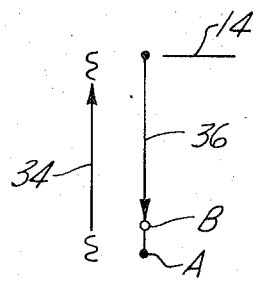
FIG. 3 is a pictorial representation of particle movements generated by shock waves in a test specimen.

The shock forces travel forwardly through the specimen plate from face 31 to face 14 in the arrow 34 direction (FIGS. 2 and 3). At face 14, the waves are reflected back through the specimen plate in the reverse direction. Presumably, the specimen particles are subjected to appreciable acceleration forces and deceleration forces as a result of the internal reflection of the waves from face 14. Such a acceleration-deceleration forces are the fracture-producing forces.

FIG. 3 pictorially illustrates the presumed action of a shock wave on a representative particle in the specimen plate. As the wave moves through the specimen in the arrow 34 direction, the particle is accelerated from its at-rest position A to a forwardly moving position B. As the wave returns from specimen face 14, as designated by numeral 36, it exerts an oppositely acting force on the forwardly moving particle. Apparently the abrupt motion reversal of the particle by the reflected wave is the source of potential fracture in the specimen material.

In general, for a given specimen fracture resistance (strength and ductility), the application of a shock wave force to islands of graduated diameter will result in displacement of the smallest islands and lack of fracture in the larger islands. By noting the smallest island experiencing fracture, it is possible to have an indication of the specimen's fracture resistance. For example, if failure occurred in a 1 inch diameter island at an imposed shock load W of 500 ft-pounds, then toughness would be expressed as W/A or (500 ft-lbs/0.785 in$^2$) or 637 foot-pounds per square inch, i.e. energy to fracture per unit area. if a smaller diameter experienced failure, then unit energy to fracture would be proportionately larger. In other words, material toughness is that much greater.

It will be noted that the shock force is applied to a face 31 of the specimen remote from the expected island fracture zone. The energy interchange for inducing fracture results from wave reflection, thus requiring force application at specimen face 31, not face 14. The specimen is mounted so that the end face of each island is untouched by the supporting structure. The island is free to vibrate without substantial energy interchange with adjacent structure. The shock energy is put into the island and reflected internally from the island rear face to interact with the specimen particles.

The drawings show various islands or buttons, 24, 26, 28 and 30 formed by machining annular grooves in the specimen plate. The islands are preferably circular in the plan dimension for simplicity of preparation and uniformity in notch or stress-concentration effect. Presumably, square or other configurations could be employed, but machining operations for control and reproducibility of form would not be very cost effective.

The depth of groove, size of button and impact energy or loading are variables. They can be adjusted, depending on the specimen material and required degree of test precision desired. Precise results would require a sufficient number of buttons to provide a suitable graduation of fracture area wherein some accurate quantification of threshold fracture resistance can be identified. If it were sufficient to test only for acceptability above a known specified fracture resistance, then only a single island of specified dimension would be required.

The groove depth, (at 16, 18, 20 or 22), controls the notch severity, plane or line of maximum tensile stress and size of accelerated mass subject to shock effects. When using graduated size islands, the groove depth should be the same for all islands. Changing the depth of groove can also alter location of the plane where reflected shock wave loading is maximized.

The impact energy applied to the specimen can be controlled through the mass or speed of the impacting disc. Similarly, if an explosive energy source is used, the amount of energy applied can be related to sheet thickness or explosive weight.

Between the use of three variables, a rather comprehensive range of test conditions can be used to control and guantitatively evaluate practically any material situation.

I wish it to be understood that I do not desire to be limited to the exact details of construction shown and described, for obvious modifications will occur to a person skilled in the art.

I claim:

1. A method for testing of short transverse direction fracture resistance in a specimen plate: said method comprising the steps of forming at least one annular groove in one face of a specimen plate to define at least one island; applying shock load to the other face of the specimen plate in areas thereof registering with each island; and ascertaining fractures developed in each island due to the shock load.

2. The method of claim 1 wherein a number of differently-dimensioned islands are formed in the plate, and wherein shock loads are applied to plate areas registering with each island.

3. The method of claim 2 wherein the shock load level is selected to impart essentially the same total energy to each island.

4. The method of claim 3 wherein the end face of each island is flat and parallel to the other face of the plate, whereby each end face has the same wave reflective ability.

5. A method for testing for fracture resistance comprising the steps of forming at least one integral protuberance on one face of a specimen plate; rigidly mounting the plate so that each protuberance is free (unconfined); applying a shock load to the other face of the plate to stress each protuberance; and ascertaining the fracture of any protuberance due to the shock stress imposed.

6. The method of claim 5 wherein each shock wave is generated by firing a disc element against said other face of the plate.

7. The method of claim 5 wherein a shock load is generated by detonating an explosive sheet on said other face of the plate.

8. A method for testing for fracture resistance comprising the steps of machining one face of a specimen plate to form at least one protruding button; applying a shock force to the plate to stress each button; and examining the specimen to determine the occurrence of fracture.

9. The method of claim 8 wherein the shock force is applied to each button by means of a disc element engaged with the other face of the specimen plate at an area thereof aligned with the button axis.

10. The method of claim 9 wherein the disc element is fired against said other face of the plate to generate the shock force.

11. The method of claim 9 wherein the disc element is an explosive charge that is detonated to generate the shock force.

12. The method of claim 8 wherein the plate is machined to form a series of graduated size buttons, and wherein a shock force is applied to each button by means of disc or projectile elements engaged with the other face of the plate at areas thereof aligned with the respective button axis; the disc or projectile elements being the same size to impart the same energy to the plate.

* * * * *